United States Patent
Shen et al.

(10) Patent No.: US 8,121,428 B2
(45) Date of Patent: Feb. 21, 2012

(54) ACCELERATED IMAGE RENDERING

(75) Inventors: Guo Bin Shen, Beijing (CN); Debing Liu, Beijing (CN); Shipeng Li, Redmond, WA (US); Yuwen He, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1112 days.

(21) Appl. No.: 11/141,363

(22) Filed: May 31, 2005

(65) Prior Publication Data

US 2006/0269147 A1   Nov. 30, 2006

(51) Int. Cl.
   *G06K 9/36* (2006.01)
(52) U.S. Cl. .......... 382/250; 348/14.13; 375/240.2; 382/235; 382/248
(58) Field of Classification Search ............ 382/232
   See application file for complete search history.

(56) References Cited

U.S. PATENT DOCUMENTS

| | | | | |
|---|---|---|---|---|
| 5,086,488 A | * | 2/1992 | Kato et al. | 382/239 |
| 5,831,678 A | * | 11/1998 | Proctor | 375/240.22 |
| 5,928,314 A | * | 7/1999 | Pelgrom et al. | 708/319 |
| 5,964,824 A | * | 10/1999 | Murata et al. | 708/402 |
| 6,008,745 A | * | 12/1999 | Zandi et al. | 341/67 |
| 6,160,920 A | * | 12/2000 | Shyu | 382/250 |
| 2001/0019630 A1 | * | 9/2001 | Johnson | 382/232 |
| 2002/0000998 A1 | * | 1/2002 | Scott et al. | 345/667 |
| 2002/0159632 A1 | * | 10/2002 | Chui et al. | 382/168 |
| 2005/0047666 A1 | * | 3/2005 | Mitchell et al. | 382/233 |

OTHER PUBLICATIONS

Pennebaker, William B et al., "JPEG-Still Image Data Compression Standard",1993, Chapman & Hall, pp. 67, 342, 344, 392-394, 397, and 509.*
Jacobson, G, "Random access in Huffman-coded files", Mar. 24-27, 1992, IEEE, pp. 368-377.*
Dugad, R et al., "A fast scheme for image size change in the compressed domain", Apr. 2001, IEEE, vol. 11, pp. 461-474.*

* cited by examiner

*Primary Examiner* — John Lee
(74) *Attorney, Agent, or Firm* — Lee & Hayes, PLLC

(57) ABSTRACT

Systems and methods are presented for accelerated image rendering. In one implementation, the systems and methods receive digital image data and derive intermediate data associated with the digital image data to accelerate image rendering.

20 Claims, 16 Drawing Sheets

| Parameter | Size (Bits) | Values | | |
|---|---|---|---|---|
| | | Sequential DCT | Progressive DCT | Lossless |
| | | Baseline | Extended | | |
| Lp | 16 | 2 - 65,535 | | |
| Ap$_i$ | 8 | 0 - 255 | | |

Fig. 2
(Prior Art)

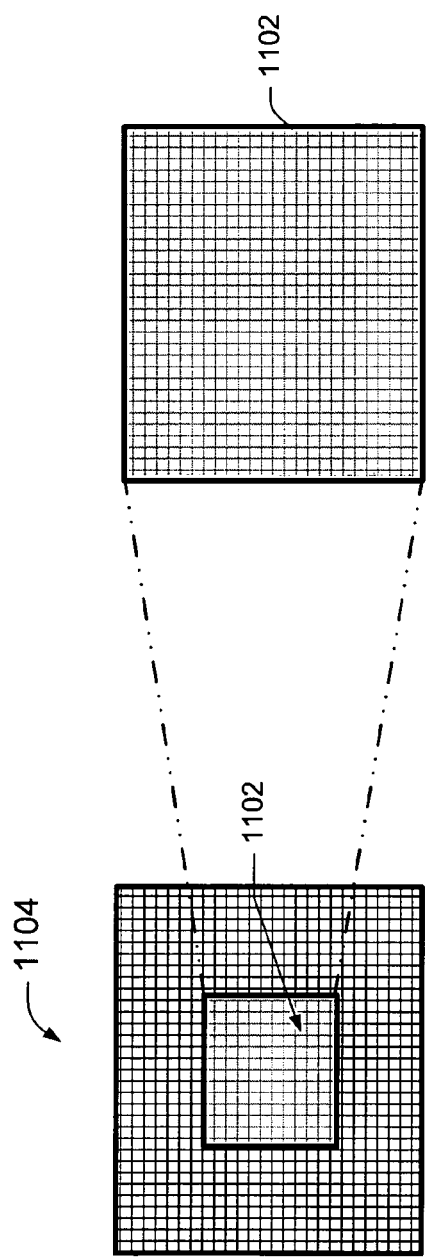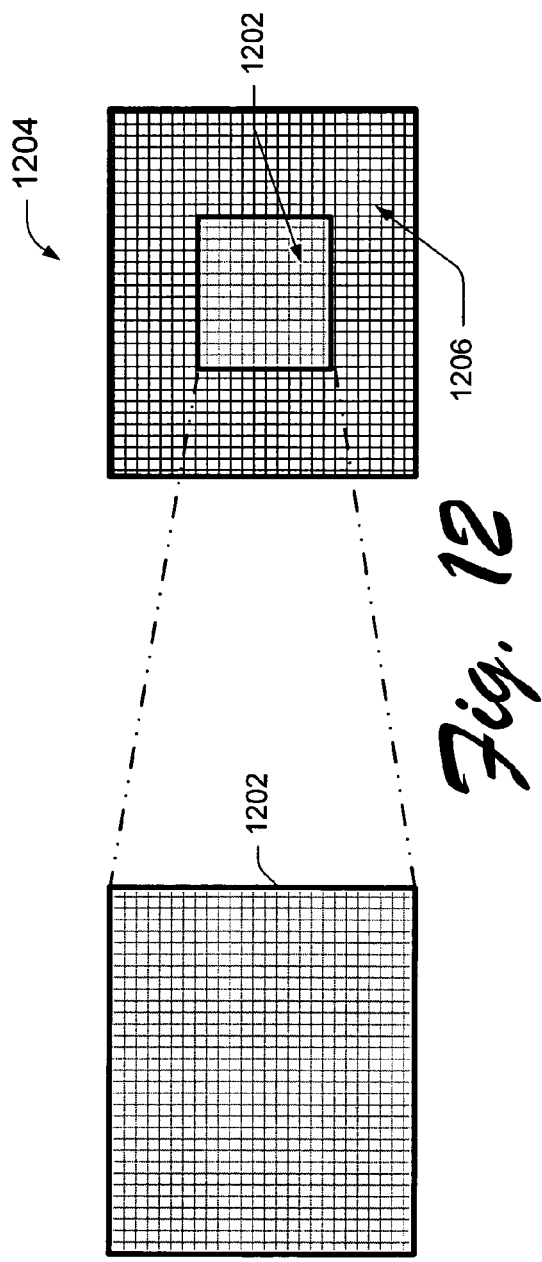

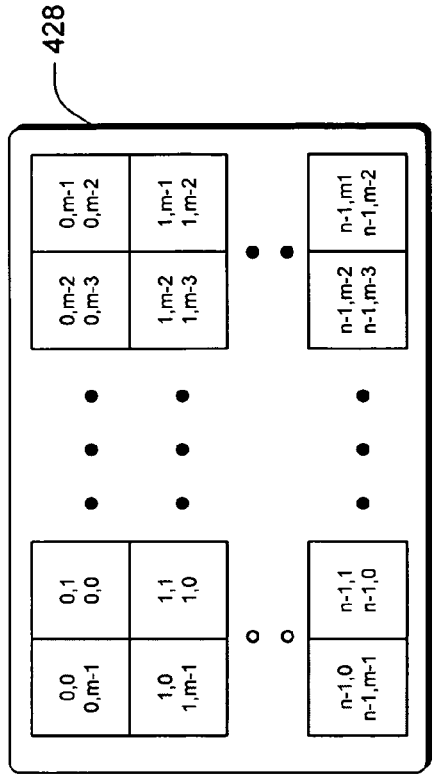
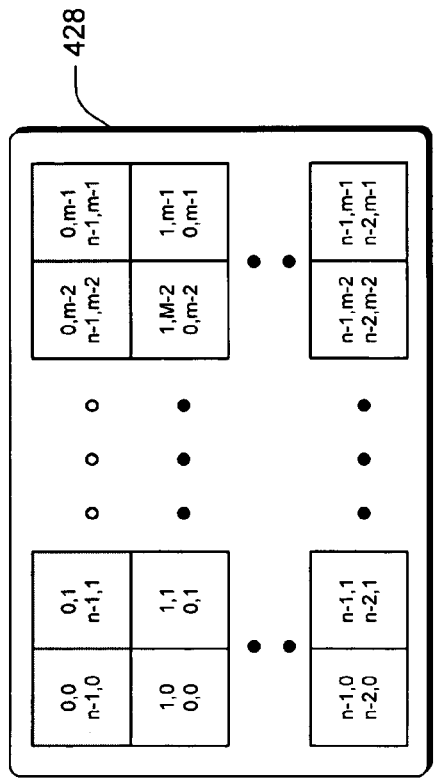
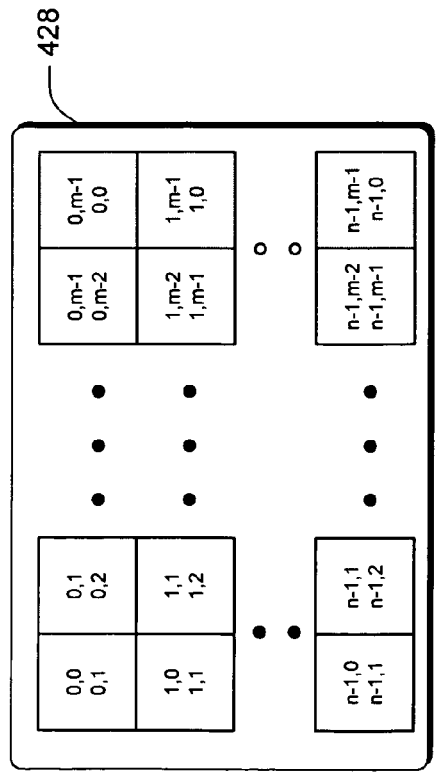
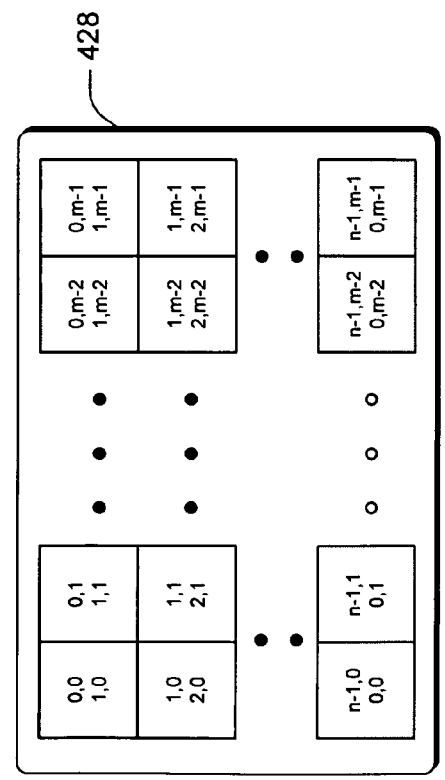
Fig. 14

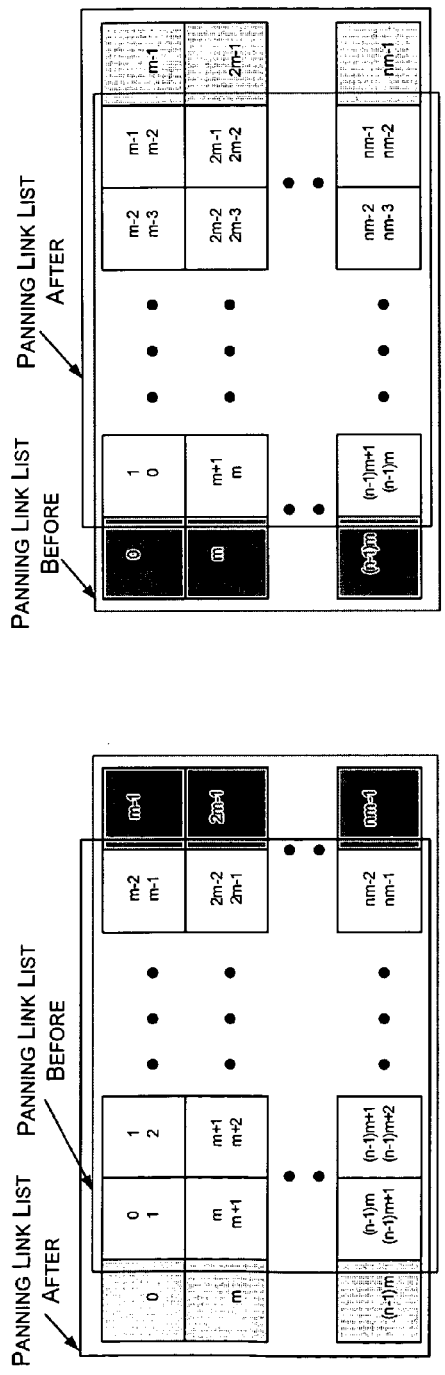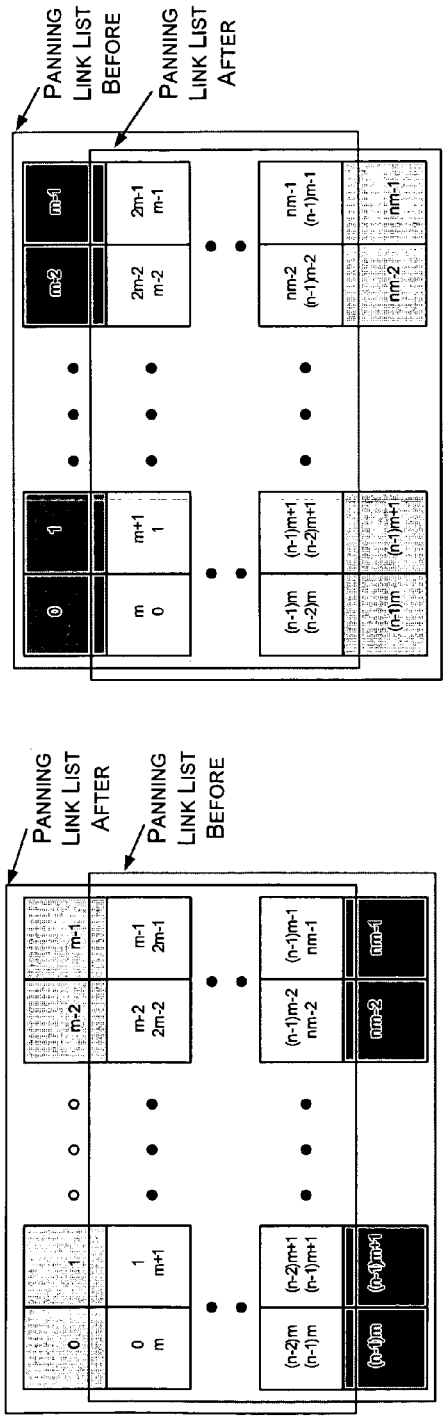
Fig. 16

ACCELERATED IMAGE RENDERING

TECHNICAL FIELD

The subject matter relates generally to digital imaging and more specifically to accelerated image rendering.

BACKGROUND

Mobile computing devices and handheld media devices often have limited processing power and a small display screen. These devices are at a disadvantage when handling digital images meant for powerful desktop computers with expansive display screens. A multi-megapixel image from a digital camera can be cumbersome for small handheld devices and so these devices can seem very slow at loading, resizing, panning, and zooming such digital images.

The quest to give handheld devices enough power to handle quality images with facility has resulted in conventional image rendering engines that are optimized with respect to the low-level code that executes the conventional parts of their operation. That is, the code itself that performs their conventional operations is written to be as fast as possible.

Syntax standards make image processing possible by setting a uniform data structure for the digital data. The JPEG standards, for example, specify a syntax for image data under which handling of digital images can be controlled across different devices, while the syntax itself tries to remain flexible and customizable. Thus, the JPEG syntax for the application data marker ("APPn marker") within image data specifies the marker segment structure for an application data segment (See JPEG standard, ref: T.81). Some JPEG codecs may change behavior when they encounter an APPn marker that appears to be recognizable. Data fields associated with the APPn marker and associated parameters can also be used to store information about an image.

FIG. 1 shows an application data segment 100. The APPn marker 102 marks the beginning of an application data segment. Application data can include metadata about an application, or even unrelated data stored in association with an image. For APP3 the marker itself is "0xFFE3." The segment length parameter (Lp) 104 specifies the length of the application data segment. The application data byte parameter 106 has an interpretation left to the application, i.e., it is an auxiliary field. The size and allowed values of each of the parameters, Lp and $AP_i$ are given in FIG. 2.

Devices that capture, send, and receive digital images try to adhere to image syntax standards, such as a JPEG syntax. What is needed, then, is a way to speed up image processing on small mobile devices that have limited processing power—not by allowing the images to become syntax non-compliant, but rather by exploiting the flexibility of the syntax in use.

SUMMARY

Systems and methods are presented for accelerated image rendering. In one implementation, the systems and methods receive digital image data and derive intermediate data associated with the digital image data to accelerate image rendering.

In one implementation, for example, an image acceleration engine includes a data preprocessing engine to move part of the image rendering processes to non-rendering stages of an image handling process. The engine also includes a fast bit stream parser, a block length map to store starting positions of image blocks, a block length mapper to randomly access image blocks, a variable length decoder utilizing the block length map to jump directly to the first bit of arbitrary discrete cosine codewords, a fast downscaler to perform optimized inverse DCT transformation and downscaling in a single step, and a panning and zooming cacher to zoom using starting positions of image blocks from the block length map and to pan by reindexing image data from the block length map, stored in a circular array cache.

BRIEF DESCRIPTION OF THE DRAWINGS

FIG. 2 is a diagram of conventional JPEG application data marker parameters.

FIG. 11 is a diagram of an exemplary caching schema for an image zooming-in operation.

FIG. 12 is a diagram of an exemplary caching schema for an image zooming-out operation.

FIG. 14 is a diagram of an exemplary caching schema for image panning in various directions.

FIG. 16 is a diagram of exemplary indexing for a linked-list schema for image panning using a block length map.

DETAILED DESCRIPTION

Overview

The systems and methods described herein provide improved image rendering speed in devices that display and manipulate digital images. These systems and methods perform various acceleration techniques, including shifting some of the workload that occurs at the rendering stage of an image handling process to other parts of the image handling process. The shifting of workload may be implemented by creating intermediate data of reduced data size and increased efficiency that, for example, summarizes and quickly maps to blocks of the original image. "Intermediate data," as used herein, means data derived from an image or created about an image, between the original digital image information and the final image rendering information. Thus, certain transition states between various digital forms of an image, or maps that allow quick access to parts of an image, can be prepared and ready to use before they are even requested. Image rendering tasks, such as panning and zooming, can be carried out much more quickly and efficiently when driven by these pre-computed intermediate data. One type of intermediate data includes a highly efficient block length map described further below.

In one implementation, an exemplary system to be described below takes advantage of idle time between image rendering tasks to pre-compute intermediate data that may be critical to the rendering speed. That is, an exemplary system offloads computational tasks of the rendering stage to other stages within the lifecycle of a digital image in a device. An exemplary system thus pre-computes some intermediate results before a final rendering stage so that the rendering process can be significantly accelerated by utilizing the intermediate data.

In one implementation, the intermediate data is embedded in the original image file in a manner that is still syntactically compatible with, for example, JPEG standards. In the case of JPEG images, this can be achieved (for example) by using some reserved fields included in the JPEG standard.

If the image rendering includes processing operations such as panning and zooming, the accelerated image rendering is especially useful for mobile devices such as cell phone and pocket computing devices that have relatively low processing power and a small display screen. Sometimes such devices are expected to handle four and five megapixel images that are really meant for digital cameras and well endowed computing systems. The accelerated image handling can greatly benefit the image rendering speed on such devices with limited processing power.

The systems and methods may also include an exemplary fast filtering process, an exemplary fast downscaling technique, and/or a smart caching technique. These will be described in greater detail below.

Exemplary System

Figure 1:
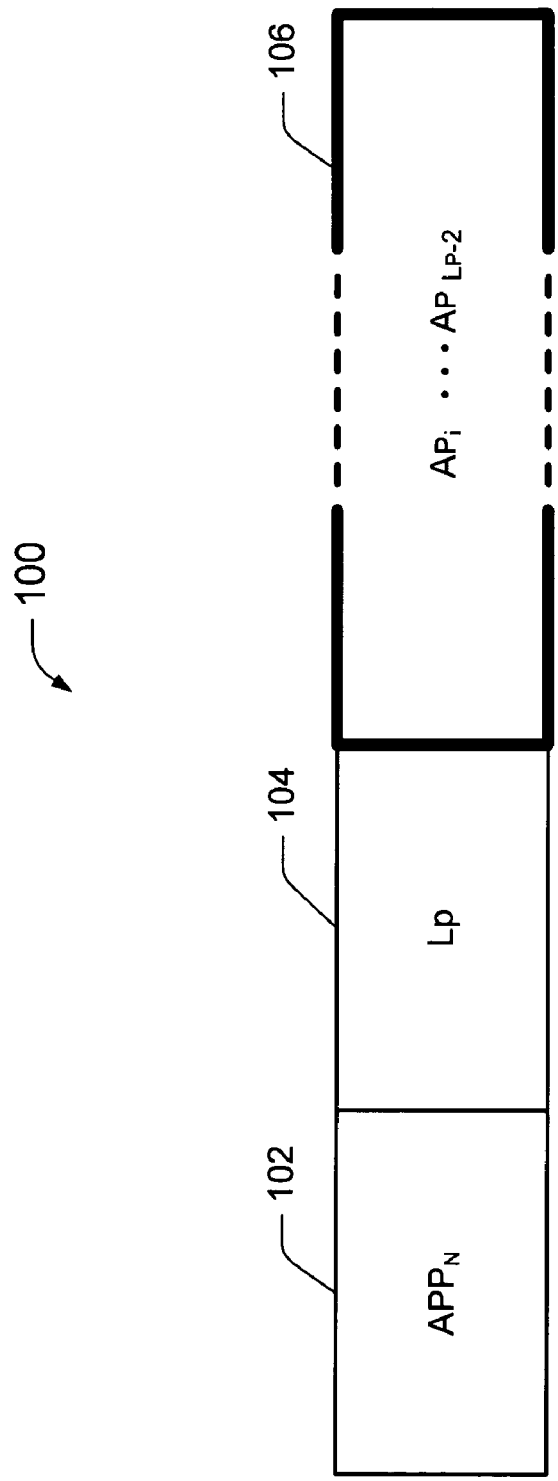
FIG. 1 is a diagram of a conventional JPEG application data marker used in an image syntax.
Figure 3:
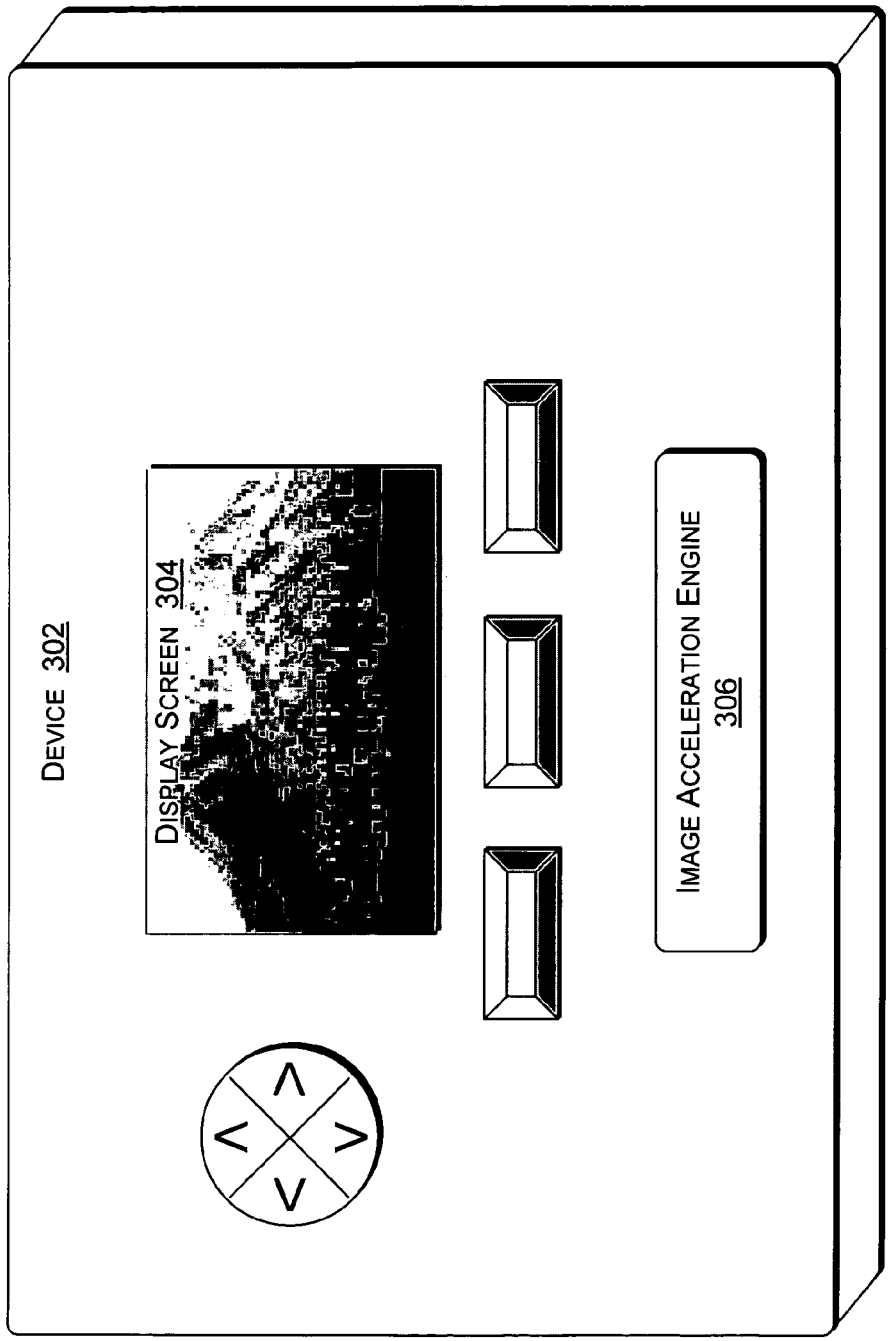
FIG. 3 is a diagram of an exemplary device including an exemplary image acceleration engine.

FIG. 3 shows an exemplary system 300 that includes a device 302 capable of displaying images, i.e., a portable computing device or a portable media device. The device 302 may have state-of-the-art processing power and display capabilities, but more typically is a mobile communication device or a mobile computing device that has constrained processing power compared with a desktop computing device, and a relatively limited display screen 304.

An image acceleration engine 306 speeds up image rendering in the device 302. If the device 302 is portable and the display screen 304 is relatively small, then such a portable version of the device 302 may tend to rely on panning and zooming operations for image display, in order to compensate for an inability to display a large image areas all at once. The panning and zooming operations allow use of the small screen size, but typically need more processing power—a resource that a portable device is likely to have in short supply.

In one implementation, the image acceleration engine 306 makes better use of the available processing power than conventional image rendering engines. By pre-computing intermediate data, e.g., during idle time in the device 302, the image acceleration engine 306 can speed up image rendering despite the limitations of such a portable device 302 by avoiding a processing bottleneck when image rendering is occurring or imminent. The image acceleration engine 306 can also benefit devices that have no processing and display limitations and bottlenecks.

Figure 4:
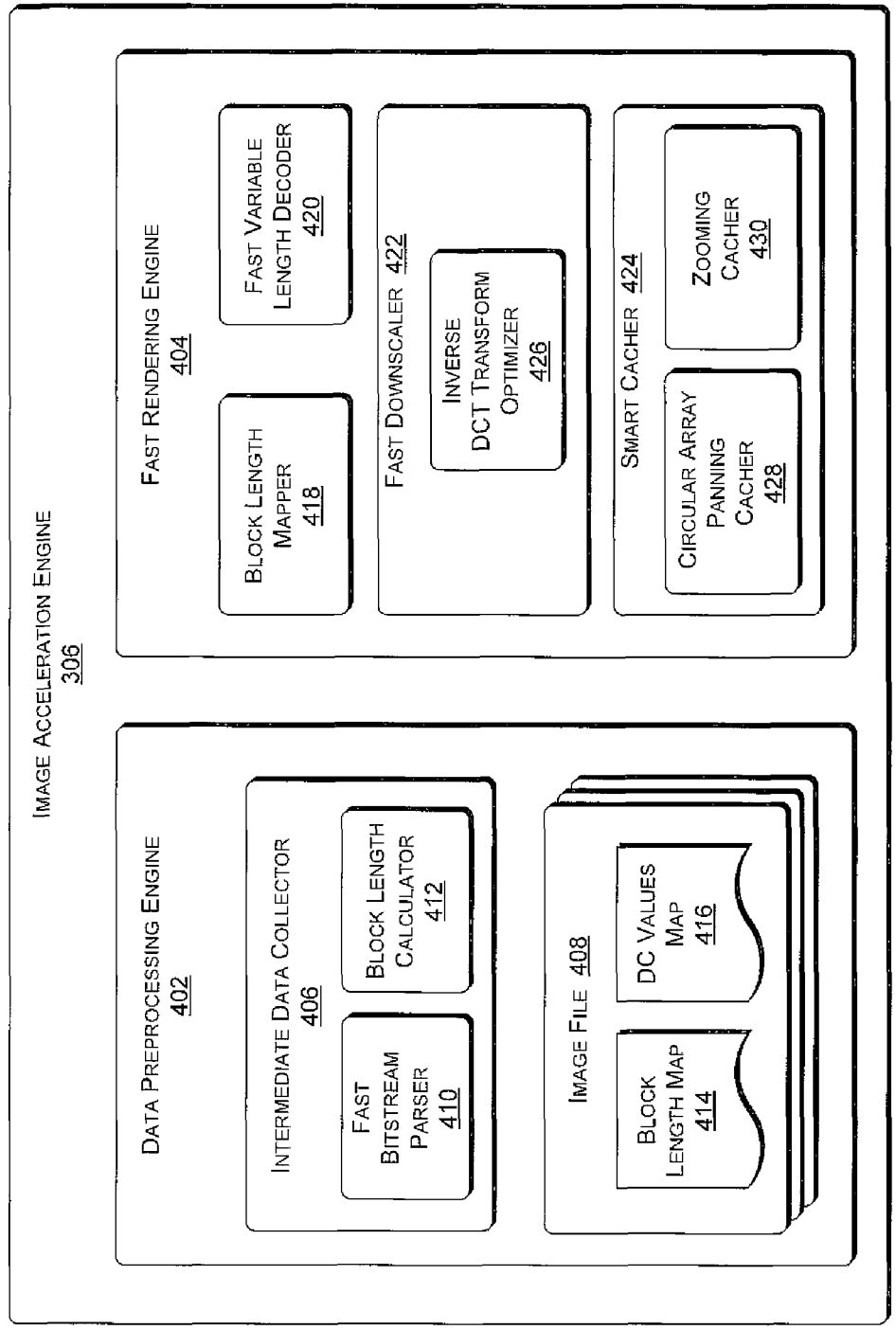
FIG. 4 is a block diagram of an exemplary image acceleration engine.

FIG. 4 shows the image acceleration engine 306 of FIG. 3 in greater detail. The image acceleration engine 306 of FIG. 4 is meant to provide one example arrangement for the sake of overview. Many other arrangements of the illustrated components, or similar components, are possible. Such an image acceleration engine 306 can be executed in hardware, software, or combinations of hardware, software, firmware, etc.

The exemplary image acceleration engine 306 includes a data preprocessing engine 402 and a fast rendering engine 404. The preprocessing engine 402 further includes an intermediate data collector 406 and one or more image files 408. The intermediate data collector 406 may include a fast bit stream parser 410 and a block length calculator 412. In this implementation, the one or more image files 408 include a block length map 414 and a DC values map 416. There may be a block length map 414 and a DC values map 416 for each image file 408. (An image file 408 typically stores one image.)

The fast rendering engine 404 includes a block length mapper 418, a fast variable length decoder 420, a fast downscaler 422, and a smart cacher 424. The fast downscaler 422 may include an inverse DCT transform optimizer 426. The smart cacher 424 may further include a circular array panning cacher 428 and a zooming cacher 430.

The components of the image acceleration engine 306 just listed can perform their functions at different points during an image rendering process. Thus, some of these components will be discussed next in the context of such an image rendering process.

Figure 5:
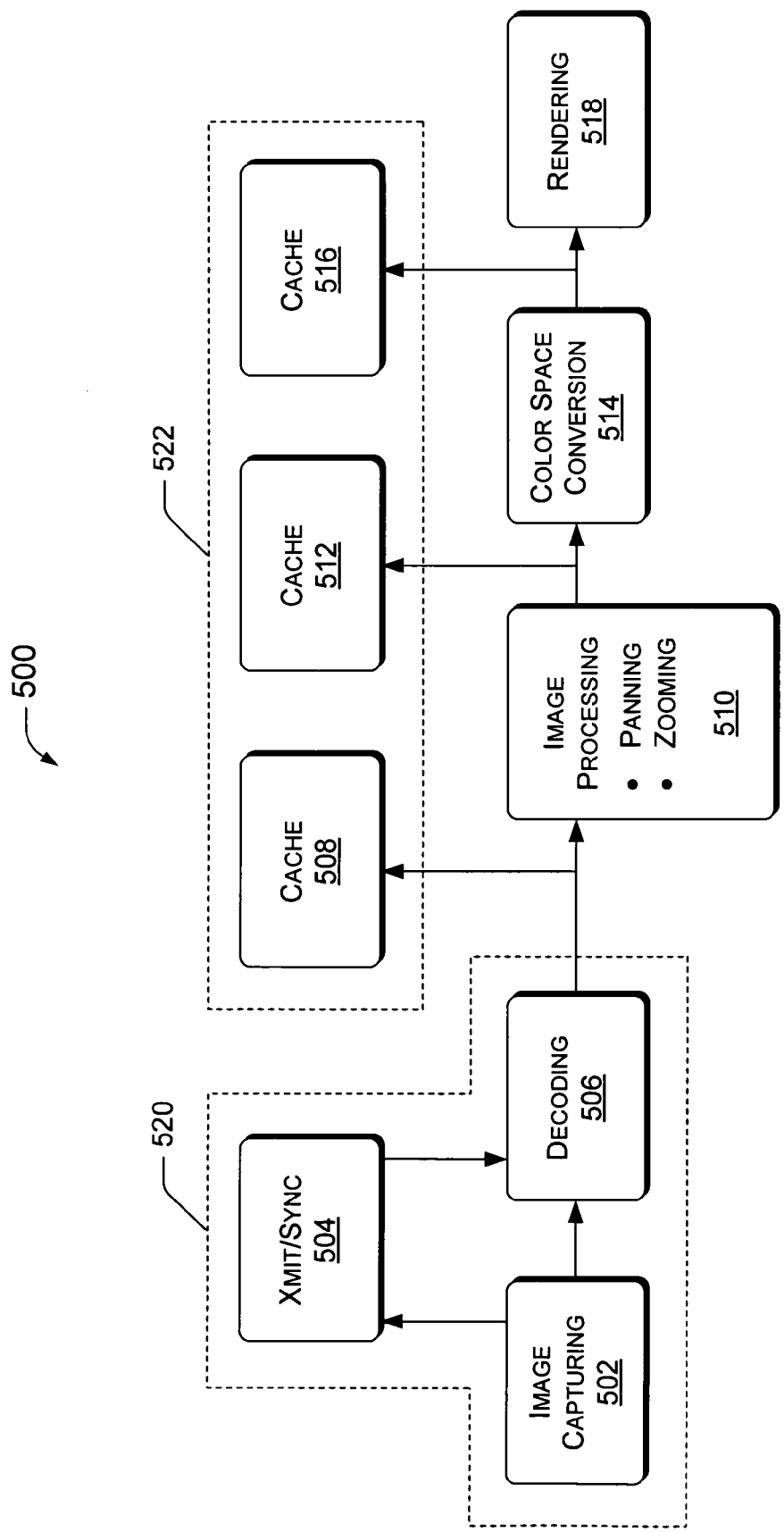
FIG. 5 is a block diagram of an exemplary image handling process.

FIG. 5 shows tasks—an "image rendering process" 500—performed by the exemplary image acceleration engine 306. The image acceleration engine 306 can perform image capturing 502, transmitting/synchronization 504, decoding 506, a first caching stage 508, image processing 510 (optional in some implementations), a second caching stage 512, color space conversion 514, a third caching stage 516, and rendering 518. There are points in this exemplary process 500 at which the image acceleration engine 306 can obtain and/or apply intermediate data.

The data preprocessing engine 402 introduced above with respect to FIG. 4, gathers and/or creates intermediate data in the beginning stages 520 of the image rendering process 500. The bit stream parser 410 component of the intermediate data collector 406 may gather intermediate data during the copying, downloading, streaming, etc. that occur within an image acquiring task 502; a transmission/synchronization task 504; a decoding task 506; etc. In one implementation, the bit stream parser 410 can also exist as a standalone application to be launched during device idle time. Either way, the fast bit stream parser 410 tries to make the computation of the intermediate data as unnoticeable as possible to a user of the device 302.

For a system or device 302 that uses image panning and zooming in the image processing 510, the fast downscaler 422 of the fast rendering engine 404 can provide acceleration for the discrete cosine transformation (DCT) operations and perform downscaling simultaneously. The fast downscaler 422 can merge downscaling and inverse DCT, using simplified inverse-DCT-like transforms to simplify inverse DCT operations. Thus, the fast downscaler 422 provides accelerated image processing over conventional methods, which first apply inverse DCT to a whole block and then perform downscaling in the spatial domain. The fast downscaler 422 combines these two processes into a simultaneous operation and adds further speed by using the simplified transforms.

For panning (and zooming), the smart cacher 424 component of the fast rendering engine 404 can be implemented in various of the last stages 522 of the image rendering process 500, such as first caching 508, second caching 512, and third caching 516. These different caching points are optional, and so a given implementation may not have all three. The most frequent image processing tasks for such devices are "zooming-out" and panning (viewing only part of the image and moving around) since the device screen resolution is smaller than the original image size. A "zoom-in" to an already zoomed-out image is considered a zoom-out with respect to the original image as long as the size of the zoomed in portion is smaller than the original image size.

The intermediate data collector 406 pre-computes some intermediate data that can be critical to the rendering speed and places the intermediate data into the image file 408. Although the intermediate data collector 406 aims to compute intermediate data when the device is idle, in practical situations, a user may want to view the image immediately after the image is taken by a camera or otherwise digitally obtained. Therefore, the picture acquiring stage may be one of the best places in the process for taking on the additional load of calculating intermediate data.

The picture acquiring stage can include picture synching 504 (include copying, downloading, streaming etc.) and/or image capturing 502 (if the device has a camera attached). Although this description refers to the picture acquiring stage for illustrative purposes, the exemplary techniques described herein can be adopted by picture capturing devices (i.e., camera software drivers) or a dedicated filtering process in the idle time of the device, as well. If the intermediate data collector 406 performs the task of computing the intermediate data in the acquiring stage, the computation itself should be as fast as possible and can be pipelined with the acquiring operations. For example, if the image synchronizing bandwidth is 20 Mbps, and if the intermediate data can be obtained in less than 0.4 second for a 1 Mb image, this intermediate data collection/creation process will be invisible to the user.

Details of the layout and data structure of the intermediate data are now described, as well as more details of the fast bit stream parser 410 that performs a semi bit stream parsing process to collect the intermediate data.

Intermediate data that accelerates the decoding/rendering process can consist of several parts. The most useful type of intermediate data, which will be stored in the exemplary block length map 414, maps the start position (in bits) of each block to speed up block operations since bit stream parsing is one of the most time consuming processes during decoding 506. The exemplary block length map 414 will be discussed in greater detail further below.

Another type of intermediate data, which is stored in the exemplary DC values map 416, consists of DC values of all the blocks in the image. In some implementations, the DC values map 416 is optional. In other implementations, its use can be turned on or off depending on a trade-off between the performance gain if it is used and the computation and storage costs. An application can decide whether or not to use the DC values map 416.

Figure 6:
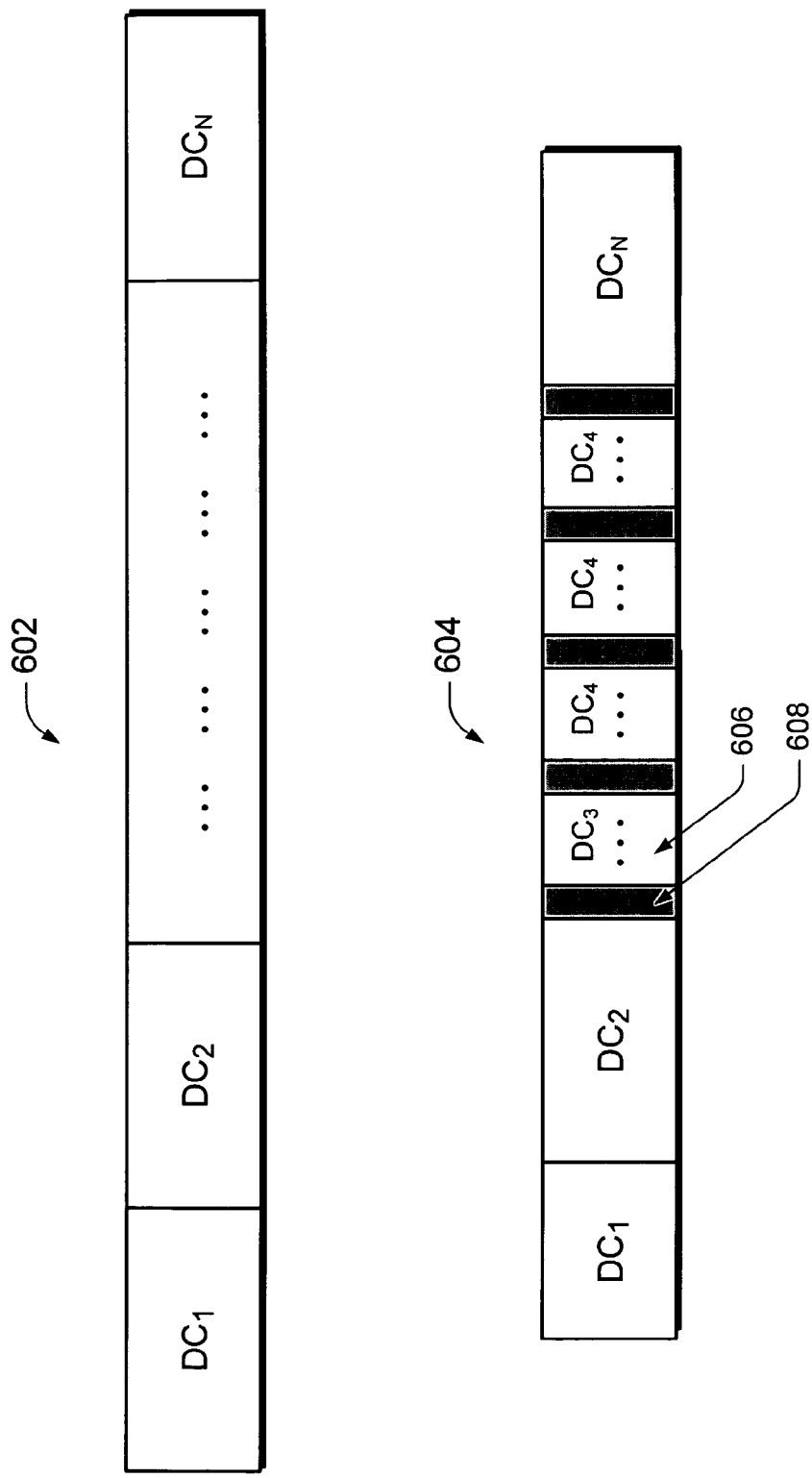
FIG. 6 is a diagram of exemplary techniques for laying out a DC map.

The DC values map 416 can be a data segment—that stores all the DC values of all the blocks in the image. All the DC values can be captured with the same ordering that they have in the original image file. As shown in FIG. 6, there are at least two ways to store the DC values. One technique is to store the decoded DC values themselves, as in data segment 602. In a JPEG implementation, the restart marker (0xFFD0~0xFFD7) is kept together with DC bits. Storing the uncompressed values as in data segment 602 results in a higher computational load for the filtering process and a larger space overhead for the intermediate data, but makes the rendering slightly faster. Another technique stores compressed DC values, as in data segment 604. In this case, each compressed DC value (e.g., 606) may be preceded by its associated restart marker 608. This technique of storing DC values in a data segment 604 may sometimes be superior because it can make computation of the intermediate data more invisible to a user.

The fast variable length decoder 420 in the device 302 can cache the decoded DC values such that throughout the viewing process of a picture, the DC values are decoded only once. The fast variable length decoder 420 may also selectively cache some decoded DC values so as to achieve a better trade-off between cache memory footprint and computational load.

Yet another type of useful intermediate data includes results obtained from a content analysis engine to assist smart (or automatic) image browsing, smart thumbnailing, etc. This kind of intermediate data, however, can be computationally expensive to compute.

The exemplary block length map 414 can be a data segment that stores position information (in bits) of each block. In one implementation, padding bits (e.g. "1" bits) and emulation-prevention bytes (i.e., 0x00's following 0xFF's) are included when calculating the start position, even though they are removed at the fast variable length decoder 420 during the actual decoding process. In one implementation, it is possible to store the start position of every block with respect to the same reference point (e.g., the beginning of the file). However, this can waste a great deal of space. In another implementation, the intermediate data collector 406 performs differential coding of the start positions, equivalent to the length of each block. The ordering of the lengths are the same as the ordering of the blocks in the original image file. In this implementation, the absolute start position of a block is the running sum of all preceding blocks. In one example, the starting position is the first bit of the Huffman code in the Primary Data section. Since the starting position of the first block is zero, it is omitted from the block length map 414. The start position of the first bit of the Huffman code in the primary data section is recorded to avoid repeatedly decoding the file header segments.

Even though the block lengths may be recorded in bits, in one implementation the resulting data space overhead may still be large, because the fast bit stream parser 410 expresses the block length with fixed-length integers for fast processing speed. The JPEG standard, for example, allows a user-defined Huffman table and the only constraints it imposes on Huffman tables is that each entry should not exceed 16 bits in length for each symbol and that the value of each non-zero quantized DCT coefficients should not exceed 16 bits either. So the theoretical upper bound for the block length is 64* (16+16)=2048, which requires 11 bits to express, although this upper bound can never be achieved for real applications.

Figure 7:
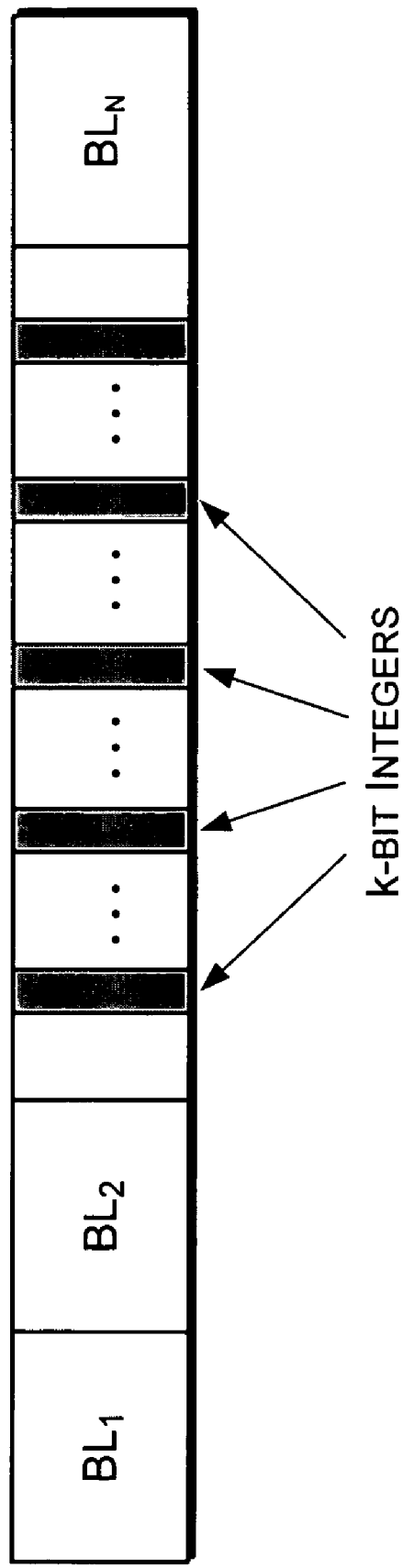
FIG. 7 is a diagram of an exemplary block length map.

As shown in FIG. 7, to reduce data overhead, instead of using 11 bits to encode each block length value to favor fast processing speed, the fast bit stream parser 410 adopts a coding rule consisting of using a fixed length k-bit integer to represent the block lengths. In one implementation, the first byte of the block length map 414 signals the value of k determined by the block length calculator 412.

At the block length calculator 412, a k-bit integer can represent a quantity, in this case length, ranging from 0 to $2^k-1$ bits. For example, if a 5-bit integer is selected to represent the block length (k=5), the 5-bit integer can represent all lengths between 0 and 31. However, if the block length is larger than 31, the 5-bit integer can no longer represent the length. To handle this situation, in one implementation, the block length calculator 412 applies an exit code. If the length is larger than $2^k-1$ bits, then the length may be represented by an exit code followed by the residue, that is, the actual length minus $2^k-1$. If this residue is still larger than $2^k-1$, the exit coding rule can be applied repeatedly until the residue falls into the range of zero to $2^k-1$. When the block length is equal to the criterion for using a residue instead of the length, then the block length calculator 412 can apply special handling to decide whether or not to use the residue schema.

A general rule for the exit code can be to use either all zero bits (i.e., k continuous zero bits) or use all one bits (i.e., k continuous one bits). In one implementation, the block length calculator 412 applies all zero bit symbols as the exit code since the minimum block length is six bits if a JPEG recommended Huffman table is used. Even if customized Huffman tables are provided, the minimum block length is no smaller than two bits. So, it is safe to use all zero bits as an exit code. It is also possible to adopt other values as the exit code. Also, when the minimum block length is b, it is possible to shift the representing range of k bits by an offset to $[b, 2^k-1+b]$ from $[0, 2^k-1]$.

In one implementation, the block length calculator 412 determines the optimal value of k according to Equation (1):

$$k = \arg\min_{m}\left(\sum_{n=0}^{11}\lceil\frac{n}{m}\rceil \cdot h_n \cdot m \leq \sum_{n=0}^{11}\lceil\frac{n}{m+1}\rceil \cdot h_n \cdot (m+1)\right), \quad \text{Equation (1)}$$

where n stands for the length (expressed in number of bits required) and $h_n$ is the frequency (number of times) that blocks with length n appear. Thus, in one implementation, the block length calculator 412 obtains the optimal k by obtaining a histogram of all the lengths of all the blocks (expressed in bits). This type of intermediate data collection can be accomplished, as mentioned above, during device idle times, or as an image is being acquired, etc. The block length calculator 412 can trade the data space overhead for further acceleration of the image processing by promoting k to a multiple of 8 to avoid bit shifting operations. For example, if the optimal value of k is seven, the block length calculator 412 can promote it to eight.

The block length calculator 412 can also specify compression of the start positions and the block lengths, which can lead to much smaller data space but may need a decompression process. Since the block length map 414 may be cached and is decoded only once, it can be advantageous to use compression of the block length map 414. In one implementation, the correlation between neighboring block length values can be used by applying a differential coding followed by a simple entropy coding. In this case, the intermediate data collector 406 can convey the entropy coding rules and associated tables to the fast variable length decoder 420, using a methodology similar to the standard JPEG Huffman table specification mechanism.

In one implementation, the size of a block length map 414 is usually approximately 10% of the original image file size. In cases where the data size of the block length map 414 (and other intermediate data, such as the DC values map 416) is still too much for the bandwidth of the device 302, the granularity of the data can be made coarser. For example, the intermediate data collector 406, perhaps cued by a particular application, can collect the intermediate data every several blocks instead of every block. If the intermediate data collector 406 gathers less intermediate data, though, this implies more computation at the fast variable length decoder 420. However, by gathering coarser data in this manner, a suitable trade-off between the increased data size overhead and decoding speed can be achieved. The granularity of intermediate data thus gathered is communicated to the fast variable length decoder 420 via signaling.

The fast variable length decoder 420 may cache the calculated absolute start positions of all blocks, or may selectively cache some start positions of some blocks so that repeated computation of these start positions can be reduced or avoided.

Storage for Intermediate Data

Returning to FIG. 4, the illustrated implementation of an image acceleration engine 306 depicts storage of intermediate data (e.g., block length map 414 and DC values map 416) in image files 408. Other possibilities for preserving intermediate data, however, can also be used.

In one implementation, the data preprocessing engine 402 uses an APP3 marker segment, which is reserved for applications (e.g., JPEG standard specification, ITU T.81, table B.1, page 32), to store intermediate data. Other APPn marker segments can also be used. The COM marker segment can also be used, but its use is more tentative as a user may wish to add comments to images. APP3 is a good choice because APP0 is used by JFIF (see, the JPEG File Interchange Format) and APP1 and APP2 are used by EXIF (see, EXIF Version 2.2).

The JPEG standard imposes a constraint on all APPn segments that their sizes can not exceed $2^{16}$ bytes (65,536 bytes, i.e., "64 KB"). Therefore, if the intermediate data size exceeds 64 k bytes, multiple APP3 segments can be used. One benefit of this layout is that it is fully standard compatible. When the images processed by an exemplary image acceleration engine 306 are shared with other devices, no further or additional format processing is needed. The APP3 segment can also be removed, if needed. In one implementation, two-pass processing is used since until the end of a first pass, the final length of the intermediate data cannot be determined. In a one-pass implementation, however, the data preprocessing engine 402 can reserve the segment length to the maximum length of the intermediate data and add padding if the actual intermediate data obtained or created is less than the maximum length. Such padding, however, may waste data space.

Figure 8:
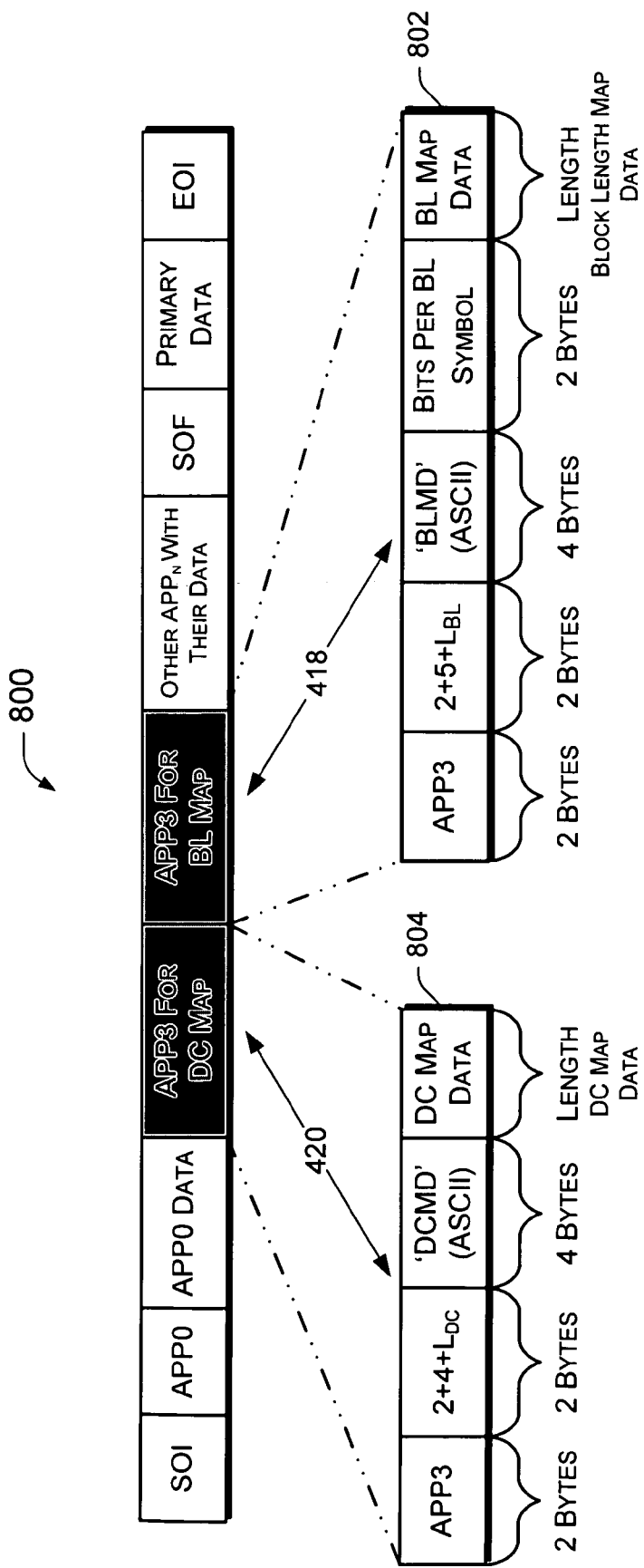
FIG. 8 is a diagram of an exemplary technique for storing intermediate data in data spaces associated with application data markers.

FIG. 8 shows a first exemplary layout 800 of a storage schema for intermediate data, such as placing the block length map 414 and DC values map 416, as described just above, in an image file 408. An APP3 marker segment contains the block length map 414 and an APP3 marker segment contains the DC values map 416. The block length map 414 includes various bits of information before the block length map data 802, and likewise, the DC values map 416 includes various bits of information before the DC map data 804.

The relative ordering of the DC values map 416 and the block length map 414 can be arbitrary. Assuming that the data length of the DC values map 416 is $Length_{DC}$ and the data length of the block length map 414 is $Length_{BL}$, if the length of DC values map 416 is larger than 65529 bits (i.e., 65535-6), then the DC values map 416 can be split into multiple APP3 marker segments because of the 16 bit constraint for the length of an entry in Huffman tables. The same technique can be applied to the block length map 414. Although it is not necessary to ensure the multiple APP3 marker segments are physically continuous for the same map, their logical sequential ordering must be ensured. In one implementation, the data preprocessing engine 402 uses four bytes to store the ASCII code for 'DCMD' and 'BLMD' for DC map data 804 and block length map data 802, respectively. These are used to differentiate the map and to immunize this storage schema from other applications that may coincidentally use the APP3 marker segment for other purposes.

A second exemplary technique for storing intermediate data involves appending the intermediate data to the end of the image file 408. This type of layout can provide single pass processing. A data structure is appended to the head of the original image file 408. The size of this data structure is fixed at four bytes, with zero as the most significant bit (MSB) (assume little-endian). The other 31 bits from these 4 bytes specifies the start position of intermediate data, excluding the first four bytes. This number equals the file length in bytes. By forcing the MSB to be zero when intermediate data is available allows an application to easily determine the existence of the intermediate data since a normal image file (without intermediate data) always starts with 0xFF.

There are many ways to arrange the intermediate data at the end of the file, e.g., using the schema described with regard to FIG. 7 above, i.e., a map ID ASCII of "DCMD" for the DC values map 416, followed by map length and DC map data 804. However, this technique is not standard compatible.

In a variation of the above storage technique for intermediate data, however, the four byte addition at the head of the file is omitted, thereby preserving compatibility with the syntax standard. The intermediate data is simply appended to the end of the image file 408. In this case the rendering device, such as the fast rendering engine 404, does not have the omitted four bytes and so performs a search for the APP3 marker and the DCMD and/or BLMD pointers to determine if this auxiliary intermediate data exists for a given image file 408. Unexpectedly, the search process for finding the APP3 marker and the DCMD and/or BLMD pointers, if they exist, is very fast. Thus, this method of storing the exemplary intermediate data at the end of an image file 408 affords acceleration of image processing while preserving compatibility with the syntax standard.

Figure 9:
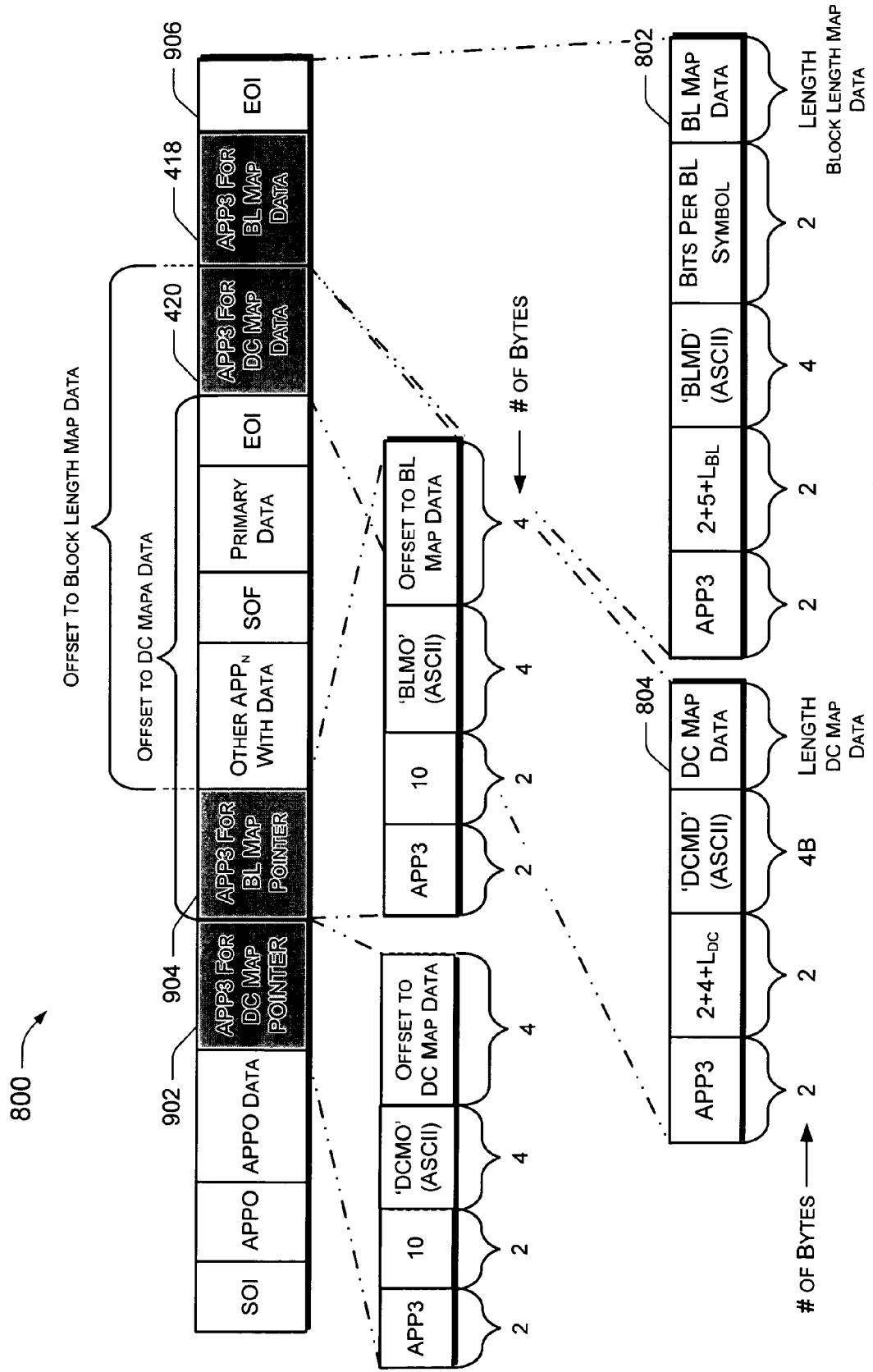
FIG. 9 is a diagram of another exemplary technique for storing intermediate data in data spaces associated with application data markers.

FIG. 9 shows an exemplary third schema 900 for storing the intermediate data that uses one or more pointers (e.g., 902, 904) stored in APP3 marker segments to store the offsets to the beginning position of the intermediate data, also stored in APP3 marker segments. A final EOI marker 906 is appended to the end of the last APP3 marker segment.

In this third exemplary schema, the data preprocessing engine 402 uses four bytes to store the ASCII code for 'DCMD' and 'BLMD' for DC map data 804 and block length map data 802. The two APP3 marker segments (902, 904) that contain the pointers are fixed length with a data field that can be ASCII codes of "DCMO" and "BLMO" for the offsets to the DC map data 804 and block length map data 802, respectively. These are used to differentiate the map and to immunize this exemplary schema from other applications that coincidently use the APP3 marker segment for other purposes.

Since the block length map 414 uses an optimal k-bit integer to represent the block length information, this information is converted and stored in a "bits per block length symbol" field in the APP3 marker segment for block length map data 802. As mentioned above, it is possible for an application to use compression for the block length data. If compression is used, the application specifies the compression schema and companion entropy coding tables.

If the intermediate data collector 406 selects a coarser granularity, described above, then the granularity of the intermediate data can be conveyed to the fast variable length decoder 420 in the APP3 extension. For example, another byte can be used after the ASCII code for BLMD (and/or DCMD) for this information. In one implementation, the DC values map 416 and the block length map 414 have different granularities.

For this third exemplary storage schema 900, the ordering of the DC values map 416 and the block length map 414 can be arbitrary, but their relative position is taken into consideration when calculating the offsets for the DCMO and BLMO markers. If the length of DC values map 416 is larger than 65529 bits (i.e., 65535-6 bits), then it needs to be split into to multiple APP3 marker segments. The same technique applies to the block length map 414. For enhancing performance, the data-preprocessing engine 402 can force APP3 marker segments to be continuous for the same map to be continuous and in a sequential order.

In another storage implementation, an APP3 marker segment is used, but the APP3 segment only contains a pointer that points to another file which stores the intermediate data. This affords a single-pass processing benefit and standards compatibility. However, it associates each picture with a companion file, which makes subsequent media management tasks more complex, and sometimes impossible.

In addition to the multiple storage schemata for intermediate data just described, other layouts are also possible since other techniques described in this disclosure are not related to the placement of the intermediate data. For example, according to JPEG standards, the ordering among markers can be arbitrary. However, JFIF usually specifies that the APP0 marker (0xFFE0) follow immediately after the SOI marker (0xFFD8). In one implementation, the data preprocessing engine 402 inserts the APP3 marker segment immediately after the APP0 marker segment for improved compatibility. However, the APP3 marker segment can be placed at some other location as long as it precedes the SOFn marker (0xFFCn) of the primary image data.

In all of the layouts listed above, the original primary image data segment (the entropy coded data) remains intact, which allows fast discarding of the inserted intermediate data in situations where this may be necessary or desirable.

Alternatively, yet another storage schema for the intermediate data is to place the intermediate data for multiple images in a directory, e.g., in a dedicated file, similar to the manner in which some operating systems place thumbnails of all images in a directory into a system database file. For example, in one implementation, the intermediate data is placed into a "thumbs.db" file of the MICROSOFT® WINDOWS® operating system. This technique leaves the original image file 408 completely intact. However, the thumbs.db file may need updating whenever the files are deleted, moved, or even renamed. But, the fast bit stream parser 410 may allow an update process to be accomplished very quickly.

Fast Bit Stream Parsing

The fast bit stream parser 410 (semi bit stream parser or filter) gathers/creates the intermediate data. The fast bit stream parser 410 can be implemented in a mobile device, such as device 302, or can be used in a more powerful computing device, such as a desktop personal computing device (in case of file synching, copying, downloading, and streaming).

The fast bit stream parser 410 can greatly benefit the speed of small mobile devices that include a camera and can take a picture. The fast bit stream parser 410 may not be activated if the image acceleration engine 306 detects that an incoming image already has the intermediate data.

The fast bit stream parser 410 can provide fast table look-ups. In conventional JPEG decoding applications, the Huffman decoding process is as follows. At the beginning, an m-bit (m is typically set to 8) data is used to look up a table (Sz_Tab) to obtain the number of effective bits for a code word (i.e., run_level symbol). The code word is then used to index another table (RL_Tab) to obtain the "run" (i.e., the number of consecutive zeros between two neighboring non-zero coefficients in a Zig-Zag scan order) and the number of bits used to code the next non-zero DCT coefficient value. The non-zero DCT coefficient value is represented by that number of subsequent bits in binary.

To distinguish from the above conventional technique—i.e., to build the exemplary block length map 414—the fast bit stream parser 410 uses tables that have a different design than conventional tables in order to make the procedure faster. Specifically, for the size table Sz_Tab, each entry contains the total number of bits of all possible run_level symbols and their subsequent non-zero DCT coefficients bits. The run level table RL_Tab (with the same entry index, but not a run_level symbol any more) contains the accumulated runs of all the run_level symbols that are contained in the m-bit data. When runs are being accumulated, one is added for each non-zero DCT coefficient (i.e., each run_level symbol encountered). The accumulated runs are used to detect if the Huffman coding for a block is completed or not. If the EOB symbol is encountered during the processing, then completion of the Huffman coding for the block is known immediately.

Since the two tables, Sz_Tab and RL_Tab, are both indexed by the m-bit data, the two tables can be merged into one. In one implementation, the performance is nearly the same for using two tables or merging them into one table. The modified Sz_Tab and RL_Tab can be created using a simple search process by packing all the possible combination of code words from the Huffman Table specified into the m-bit number (which will serve as the index in the table look-up stage).

Fast Variable Length Decoding (VLD) Using the Block Length Map

In the fast rendering engine 404, the exemplary block length map 414 enables an application to immediately locate desired bits for rendering or manipulating an image or parts of an image. That is, the block length map 414 is not only much easier to wield than the full image data due to reduced data size and format optimization, but it also takes advantage of the random seek/random access capabilities in the bit stream. The fast variable length decoder 420 can accelerate decoding in many scenarios, such as the following.

For decoding a DC image, after the image is taken or synchronized, a user may want to view the full picture in the small screen of a device 302. Often the "DC image" will serve this purpose. In order for the fast variable length decoder 420 to begin at an arbitrary block, the DC value of its preceding neighbor generally is obtained. The fastest way to perform this is to decode and cache the DC image. From the block length map 414, the first bit of an arbitrary block can easily be located. Beginning at that bit, the fast variable length decoder 420 can perform its DC decoding. Instead of parsing subsequent AC bits (in order to reach the DC bits for the next block), the decoder 420 utilizes the block length map 414 and jumps directly to the first bit of the next DC codeword. The decoding of DC and AC are similar except the tables involved are different.

Having seen a DC image or a thumbnail image, the user often wants to zoom in on the DC image or thumbnail, but still at a small scale compared to the original size of the image. Since the user display screen 304 is relatively small, only a portion of original image blocks will be displayed. With the help of the block length map 414, the block length mapper 418 can ensure that only those blocks to be displayed get decoded. When a zoom-in operation is performed, only a central portion of the previous image data is displayed but each block is less down-sampled. Thus, the fast rendering engine 404 may choose to cache the position of last decoded bit for each block. The memory overhead for this caching is relatively insignificant while the caching can also help the panning operation.

To decode the full image or to zoom in on the full image, the block length mapper 418 provides (from the block length map 414) the bit position of the DC codeword of the first block to be displayed. The decoder 420 continues until the end of the first block row. Then the block length mapper 418 consults the block length map 414 again to jump to the first bit of the DC codeword of the first block in the next block row.

Fast Downscaler

For DCT domain downscaling, a conventional way to obtain a spatially decimated image includes first decoding the original image at full resolution and then applying a downsampling filter (the filter is a low pass filter that can be of arbitrary type, such as a bilinear filter, a bicubic filter, etc). The conventional technique is computationally expensive.

The fast downscaler 422 includes an inverse DCT transform optimizer 426 that can combine a filtering process with the inverse DCT transform. In one implementation, the inverse DCT transform optimizer 426 uses a technique inspired by Rakesh Dugad and Narandra Ahuja, "A Fast Scheme for Image Size Change in the Compressed Domain," *IEEE Trans. On Circuits and Systems for Video Technology*, Vol. 11, No. 4, April 2001, pp. 461-474. The inverse DCT transform optimizer 426 assumes that the downsampling ratio is k:8, i.e., that is, the inverse DCT transform optimizer 426 aims to generates a k×k block out of the original 8×8 block. In one implementation, the inverse DCT transform optimizer 426 selects the k×k DCT coefficients in the upper-left corner of the original 8×8 DCT coefficients for a block and directly applies a k×k inverse DCT to obtain a k×k image. It can be shown that the resulting k×k image is a spatially decimated version of the original image and the quality of this image is slightly better than that obtained by applying a bilinear filter in the spatial domain. In essence, the inverse DCT transform optimizer 426 takes a k×k inverse DCT of the k×k low-pass coefficients of the 8×8 DCT to directly obtain a low-passed and decimated version of the block in the spatial domain.

In one implementation, the inverse DCT transform optimizer 426 selects k=4 for the sake of easy expression. An original standard 4×4 inverse DCT transform kernel is shown in Equation (2):

$$T = \begin{bmatrix} 0.5000 & 0.5000 & 0.5000 & 0.5000 \\ 0.6533 & 0.2706 & -0.2706 & -0.6533 \\ 0.5000 & -0.5000 & -0.5000 & 0.5000 \\ 0.2706 & -0.6533 & 0.6533 & -0.2706 \end{bmatrix} \quad (2)$$

In an integer-based fast implementation, the inverse DCT transform optimizer 426 improves the speed of the k×k inverse DCT by employing an integer operation to replace the floating point operation. The inverse DCT transform optimizer 426 shift the k×k inverse DCT kernel to the left by a certain number of bits and after the transform, the elements of the resulting matrix is right shifted another number of bits. For 4×4 inverse DCT, the resulting transform kernel is shown in Equation (3), which is shifted to the left by 10 bits. Since all the numbers are integers, the inverse DCT transform optimizer 426 applies a normalization process after the transform. The normalization factor for this transform kernel is $2^{20}=1,048,576$.

$$T_i = \begin{bmatrix} 512 & 512 & 512 & 512 \\ 669 & 277 & -277 & -669 \\ 512 & -512 & -512 & 512 \\ 277 & -669 & 669 & -277 \end{bmatrix} \quad (3)$$

In one implementation, the inverse DCT transform optimizer 426 rounds by a power of two. The implementation shown above with respect to Equation (3) has the elements of the inverse DCT kernel as integers to speed up the operation. In a further enhancement, the inverse DCT transform optimizer 426 further approximates the elements to powers of two so that the multiplication operations can be replaced by shift operations. The resulting transform kernel is shown in Equation (4). The normalization factor for this transform kernel is 851,968. For this implementation, it is preferable to split the normalization into the transform process since all the numbers are powers of 2. Although fast, this implementation may result in noticeable quality loss to the resulting down-sampled images.

$$T_{i2} = \begin{bmatrix} 512 & 512 & 512 & 512 \\ 512 & 256 & -256 & -512 \\ 512 & -512 & -512 & 512 \\ 256 & -512 & 512 & -256 \end{bmatrix} \quad (4)$$

In another implementation, the inverse DCT transform optimizer 426 uses integer transform directly. For example, for a k=4 case, a 4×4 transform as used in WINDOWS® MEDIA® Video (WMV) is a good solution. A transform matrix kernel is shown in Equation (5). The normalization factor for this WMV 4×4 transform kernel is 1162.

$$T_w = \begin{bmatrix} 17 & 17 & 17 & 17 \\ 22 & 10 & -10 & -22 \\ 17 & -17 & -17 & 17 \\ 10 & -22 & 22 & -10 \end{bmatrix} \quad (5)$$

However, since the normalization kernel is not a power of 2, which implies it can not be easily achieved with shift operations, the inverse DCT transform optimizer 426 can use another 4×4 transform kernel, as shown in Equation (6). The normalization factor is 1034, but it can be safely replaced by 1024 without noticeable quality degradation for the resulting image. Normalization by 1024 is easily achieved by a right shift of 10 bits.

$$T_m = \begin{bmatrix} 16 & 16 & 16 & 16 \\ 21 & 9 & -9 & -21 \\ 16 & -16 & -16 & 16 \\ 9 & -21 & 21 & -9 \end{bmatrix} \quad (6)$$

To favor multimedia extensions (MMX) implementations, the inverse DCT transform optimizer 426 may split the normalization into two places, one is right after the first 1-D transform and the other is after the second 1-D transform. In this manner, the inverse DCT transform optimizer 426 ensures that all the data is limited to a 16-bit range, that a 32-bit register can hold two values, and that a single MMX instruction can handle a row/column of data.

Figure 10:
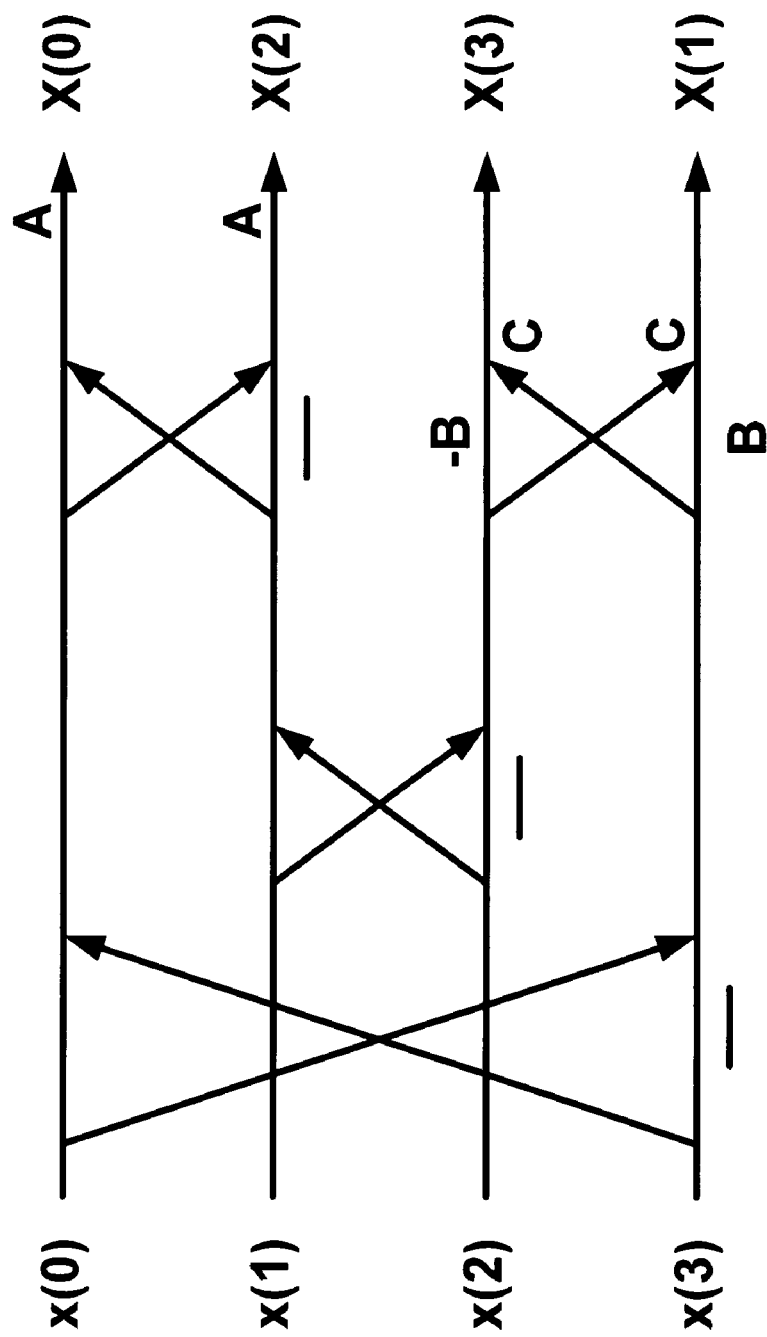
FIG. 10 is a diagram of an exemplary butterfly technique for fast 4×4 inverse DCT using a block length map.

FIG. 10 shows an implementation of the inverse DCT transform optimizer 426 that performs a technique resembling the butterfly architecture for inverse DCT. The symmetric property of the k×k inverse DCT kernel is exploited resembling the well-known butterfly implementation for $2^N$ inverse DCT. The butterfly structure for a 4×4 transform can be exploited for all the above transform kernels in Equations 3-6. For example, in FIG. 10, the A, B, C equal 512, 669, and 277 respectively, for Equation 3.

Smart Cacher

The smart cacher 424 greatly facilitates zooming and panning operations, particularly in devices 302 with limited processing power. This caching is performed after the variable length decoding process performed by the decoder 420, for example at the first stage of caching 508 in FIG. 5.

FIG. 11 shows a zoom-in operation, in which only a central portion of the blocks 1102 of a current image 1104 need to be displayed after zooming in. The zooming cacher 430 expands these central blocks 1102 to meet the footprint of the display 304 and the surrounding blocks are removed. Thus, the zooming cacher 430 can hold the DC/AC coefficients that are already decoded, which can remain unchanged for these central blocks 1102. The decoder 420 decodes more DCT coefficients for the central blocks 1102 to expand them. To accelerate the variable length decoding process, the zooming cacher 430 may also record the position of the last decoded bits for these central blocks 1102. Thus, these already decoded coefficients do not have to be decoded again and their decoding can be skipped.

FIG. 12 shows a zoom-out operation, in which the blocks currently decoded 1202 will be a central portion of the zoomed out image 1204, but the fast rendering engine 404 has to discard some DCT coefficients of the current blocks 1202 to shrink them. In one implementation, if the user zooms-in on a zoomed-out image, the fast rendering engine 404 may have to perform a fresh partial decode since the zooming cacher 434 may not normally maintain the last decoded bit position during zooming out. Thus, the block length mapper 418, which uses the block length map 414 for speed, informs the decoder 420 to perform a partial decode of new blocks 1206 surrounding current blocks 1202 in order to achieve the zooming out operation.

The circular array panning cacher 428 facilitates fast panning operations on devices 302 with limited processing power. The panning cacher 428 may perform the first caching 508 after the variable length decoding process 506, the second caching 512 after the inverse DCT operations of image processing 510, or the third caching 516 after color space conversion 514. In one implementation, the third caching stage 516 after color space conversion offers the most computational savings. In a panning operation 510, the panning cacher 428 keeps most of the blocks in the currently displayed image intact, they are just moved or displaced according to the panning direction. Since the user may pan to the left or right; up or down, the panning cacher 428 comprises a flexible data structure to facilitate the panning operation.

Figure 13:
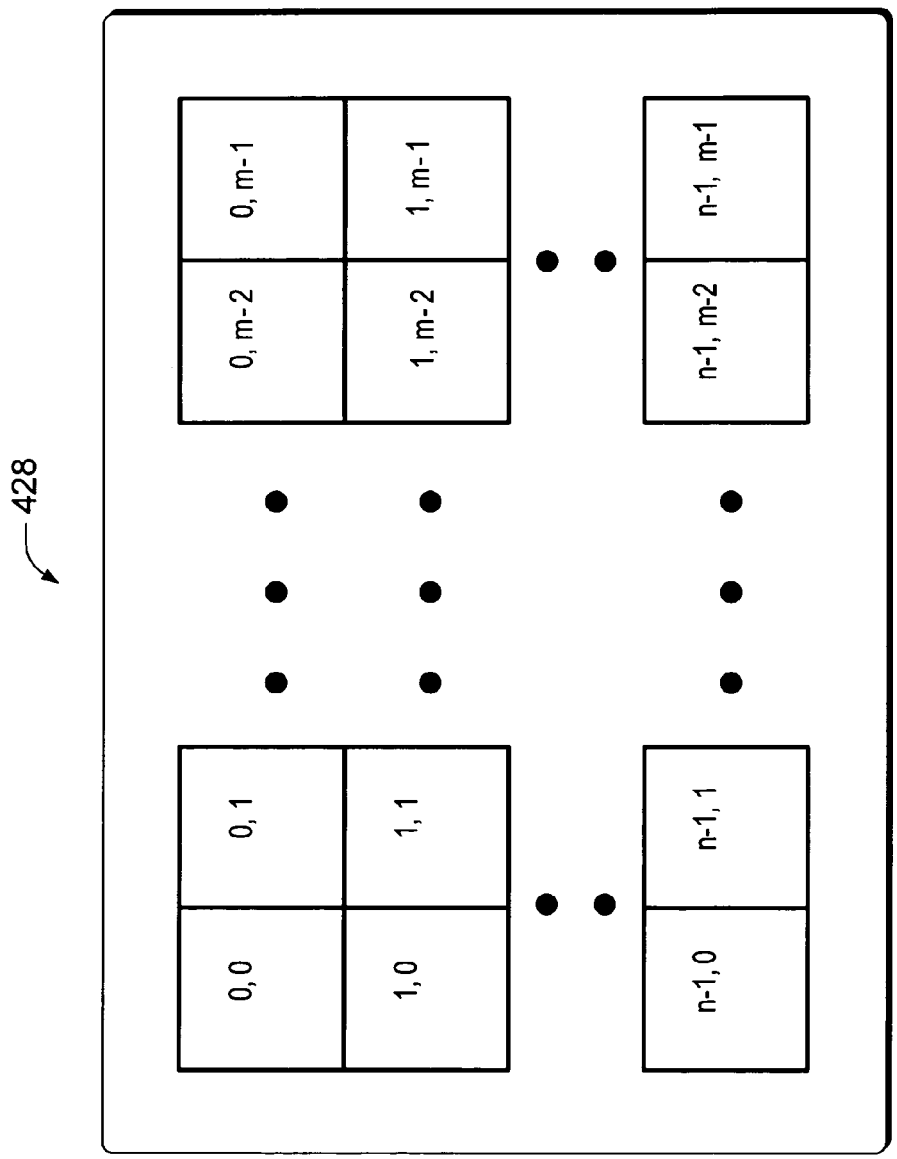
FIG. 13 is a diagram of an exemplary caching schema for an image panning operation.

FIG. 13 shows a circular array panning cacher 428 that can perform "two-dimensional (2-D) circular" caching—that is, can move mapping data stored in memory around in a manner logically analogous to the movement of an image being panned. The 2-D circular array panning cacher 428 consists of a logical memory array in which each block represents a block of memory for k×k pixels (assuming k: 8 zooming in the illustrated example). The block-wise stride, for example "m," is also recorded. Assuming that there are n block rows, then the 2-D circular array of the panning cacher 428 is of m×n dimensions. Since each element of the array is also a 2-D (or 1-D) array, the actual dimensionality of the 2-D circular array is 4-D (or 3-D). The panning cacher 428 cycles only the first two dimensional indices which correspond to panning in the up/down; and left/right directions, respectively.

FIG. 14 shows different states of the panning cacher 428 during panning. The top values in each element are the original indices prior to a panning move, and the bottom values are the indices after cycling due to a panning operation.

In one implementation, if the user pans to the left, then the two-dimensional indices are cycled, resulting in caching for panning to the left 1402. An example rule for left panning index cycling is [new_index=(orig_index+1) mod m].

If the user pans to the right, then the two-dimensional indices are cycled, resulting in caching for panning to the right 1404. An example rule for right panning index cycling is [new_index=(orig_index−1) mod m].

If the user pans up, then the two-dimensional indices are cycled, resulting in caching for panning up 1406. An example rule for up panning index cycling is [new_index=(orig_index+1)mod n].

If the user pans down, then the two-dimensional indices are cycled, resulting in caching for panning down 1408. An example rule for down panning index cycling is [new_index=(orig_index−1)mod n].

In the panning cacher 428, memory need only be allocated once. Then, all the index cycling operations can be performed in place.

Figure 15:
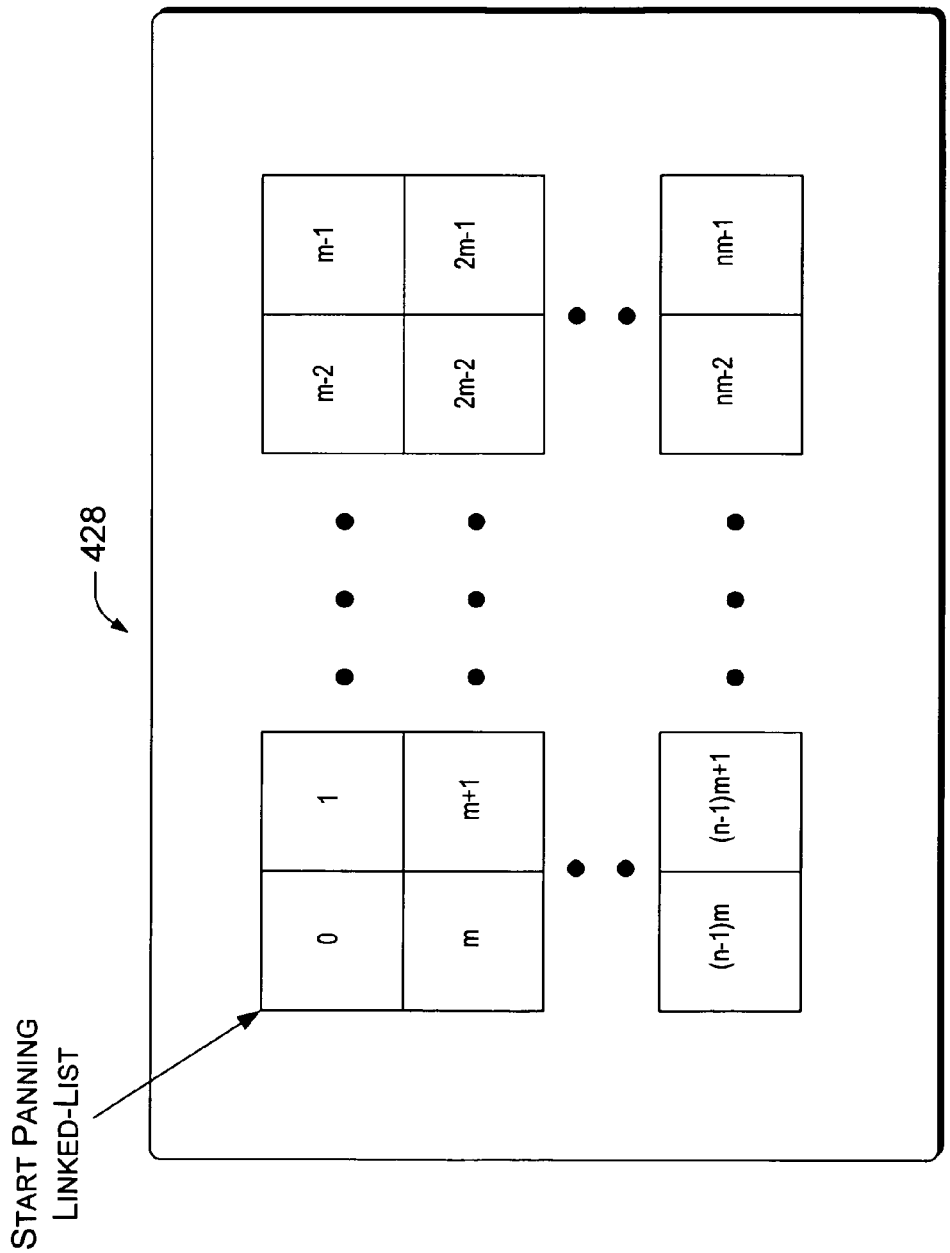
FIG. 15 is a diagram of an exemplary linked-list schema for image panning using a block length map.

In one implementation, the panning cacher 428 uses a linked-list of block memory structures for smart panning, as shown in FIG. 15. In the figure, each block represents a block of memory for k×k pixels, assuming k: 8 zooming. The linked list 1502 is formed by linking the address pointers of all the block memory in a raster scan order, i.e., from left to right and from top to bottom. The block-wise stride, for example m, is also recorded.

FIG. 16 shows an exemplary linked-list caching schema for panning operations. In the figure, the top numbers are original indices and bottom numbers are newly assigned indices. Dark blocks are the blocks removed and lightly shaded blocks are newly inserted blocks, while the white blocks are cached.

Assuming that there are n block rows, if the user pans to the left 1602, then all the block memory whose index is a multiple of m−1 is removed (excluding the first block whose index is zero). Newly decoded blocks (after color space conversion 514) are inserted and assigned new indices of multiples of m, including zero (the index of the original indexed zero block is now indexed by one).

Similarly, if the user pans to the right 1604, then the blocks indexed by multiples of m (including zero) are removed and newly decoded blocks are inserted at the positions indexed by multiples of m minus one.

If the user pans up 1606, the last m blocks will be removed and newly decoded blocks will be inserted at the front of the linked list.

If the user pans down 1608, the first m blocks will be removed and newly decoded blocks will be appended at the end of the linked list.

In one implementation, when a zooming operation is performed, the linked list is rebuilt from scratch.

Exemplary Methods

Figure 17:
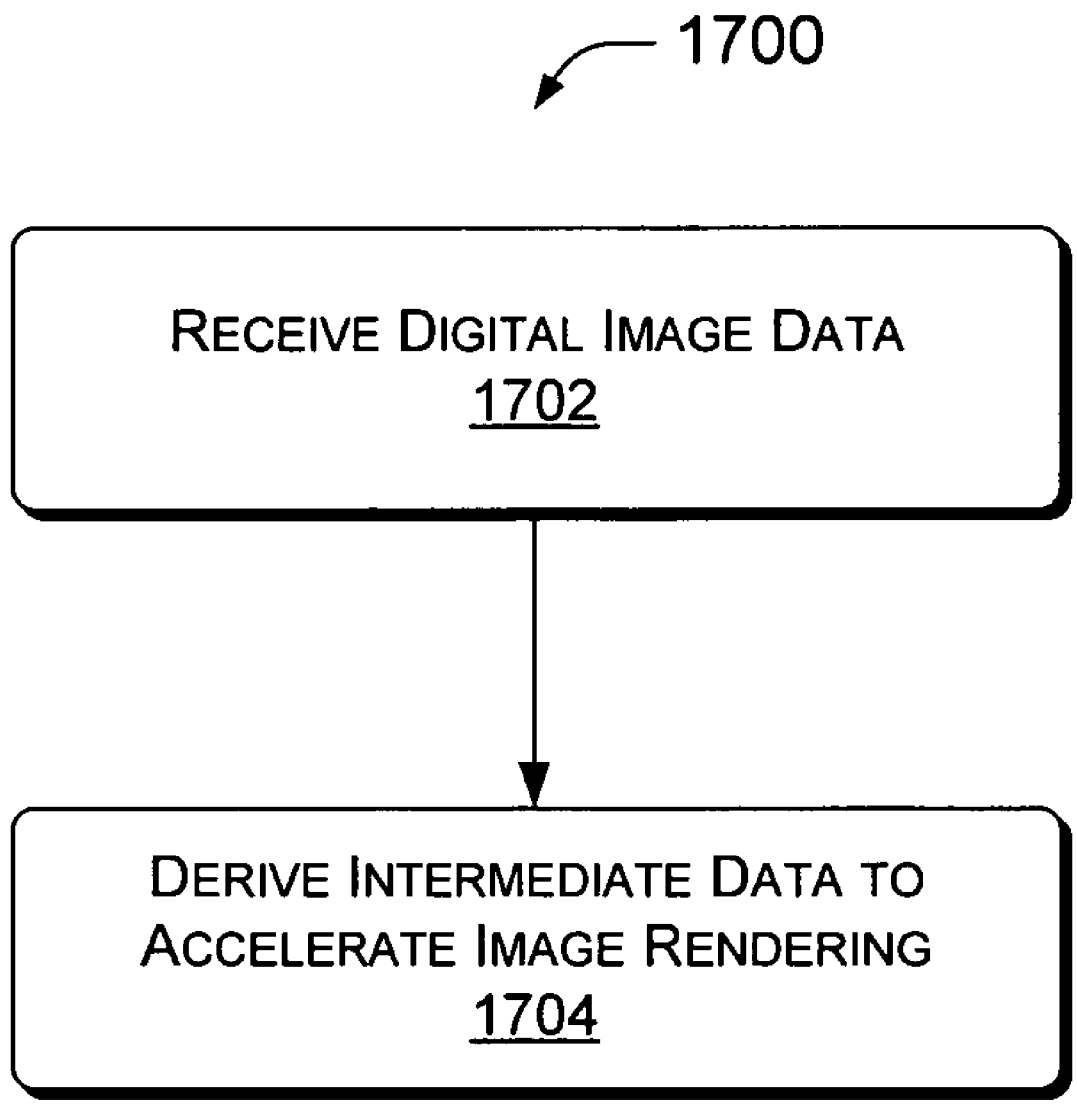
FIG. 17 is a flow diagram of an exemplary method of accelerated image rendering.

FIG. 17 depicts an exemplary method 1700 of accelerating image rendering. In the flow diagram, the operations are summarized in individual blocks. Parts of the exemplary method 1700 may be performed by hardware, software, or combinations of both, for example, by components of the exemplary image acceleration engine 306.

At block 1702, a digital image data, e.g., a bit stream, is received. The bit stream is typically formatted according to a syntax standard, such as one of the JPEG standards. In a conventional JPEG decoding, the Huffman decoding process is as follows. At the beginning, an m-bit (m is typically set to 8) data is used to look up a table (Sz_Tab) to obtain the number of effective bits for a code word (i.e., run_level symbol). The code word is then used to index another table (RL_Tab) to obtain the "run" (i.e., the number of consecutive zeros between two neighboring non-zero coefficients in a Zig-Zag scan order) and the number of bits used to code the next non-zero DCT coefficient value. The non-zero DCT coefficient value is represented by that number of subsequent bits in binary.

At block 1704, intermediate data is derived to accelerate image rendering. The work of performing the derivation of intermediate data is shifted away from the final rendering processes, and this in itself adds to the speed of the exemplary method 1700. Various types of intermediate data may be derived. For example, a block length map may be derived as intermediate data that avoids the need to locate and/or decode the same image blocks over and over. Such a block length map consists of a small and efficient representation ("map") of the digital image. When the image needs to be rendered and/or manipulated (resized, zoomed, panned, etc.) the block length map is consulted for the location of the needed image blocks, instead of mapping from the more voluminous image data itself.

Deriving intermediate data can include gathering many types of intermediate data besides the block length map. The intermediate data itself can be stored in an image file, so that the intermediate data does not have to be recomputed, but instead can be shared wherever the image is sent. This means that a powerful device can develop the intermediate data and a relatively weak mobile device can reap the benefit of speedy image rendering and handling, without have a great deal of onboard processing power.

Conclusion

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems and methods for accelerated image rendering. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   generating an image file at a portable computing device configured to accelerate image rendering, the image file including a first bitstream, wherein the first bitstream is based on a captured image, wherein at least a portion of the first bitstream represents a plurality of blocks related to the image, and wherein the first bitstream is encoded according to a joint photographic experts group (JPEG) format;
   parsing the first bitstream at the portable computing device to generate a block length map after encoding the first bitstream, the block length map including a second bitstream indicating a start position in the first bitstream of each of the plurality of blocks, wherein a particular number of bits is needed to fully express the start position of each of the plurality of blocks according to the JPEG format;

calculating, at the portable computing device, a fixed number of bits to represent in the block length map length of each of the plurality of blocks, wherein the fixed number of bits is less than the particular number of bits, and wherein a first byte of the block length map specifies the fixed number of bits;

determining an optimal value by obtaining a value of a minimum argument when a summation of a rounded up value of the length of each of the plurality of blocks over the value of the minimum argument multiplied by a frequency of the length and the value of the minimum argument is less than a summation of a rounded up value of the length of each of the plurality of blocks over the value of one increment of the minimum argument multiplied by the frequency of the length and the value of the one increment of the minimum argument;

inserting the block length map into the first bitstream in accordance with the JPEG format at the portable computing device after the first bitstream has been encoded; and rendering the captured image utilizing the block length map at the portable computing device to identify respective start positions of one or more blocks of the first bitstream.

2. The method as recited in claim 1, further comprising compressing block lengths of the block length map at the portable computing device to reduce a data size, wherein a correlation between neighboring block length values allows compression consisting of applying a differential coding followed by an entropy coding.

3. The method as recited in claim 1, further comprising deriving a DC values map at the portable computing device, to store a DC value of at least one of the plurality of blocks related to the image.

4. The method as recited in claim 1, further comprising deriving intermediate data by the portable computing device by deriving a content analysis for the captured image.

5. The method as recited in claim 1, wherein the parsing uses:
 a size table in which each entry contains a total number of bits of run level symbols and their subsequent non-zero discrete cosine transformation (DCT) coefficient bits, and
 a run level table that contains accumulated runs of run level symbols.

6. The method as recited in claim 1, wherein rendering the image includes performing variable length decoding using the block length map to randomly access a first bit of a discrete cosine (DC) codeword.

7. The method as recited in claim 6, further comprising downscaling, at the portable computing device, the image by selecting a k×k matrix of DCT coefficients in a corner of a matrix of DCT coefficients of a block and directly applying a k×k inverse DCT to obtain a k×k image.

8. The method as recited in claim 7, further comprising improving the speed of the k×k inverse DCT by employing an integer operation to replace a floating point operation at the portable computing device.

9. The method as recited in claim 7, further comprising improving the speed of the k×k inverse DCT by rounding coefficients to a power of two at the portable computing device.

10. The method as recited in claim 7, further comprising improving the speed of the k×k inverse DCT by using an integer transform directly at the portable computing device.

11. The method as recited in claim 7, further comprising improving the speed of the k×k inverse DCT by using a symmetric property of the k×k inverse DCT kernel in a butterfly implementation for $2^N$ indirect DCT at the portable computing device.

12. The method as recited in claim 1, further comprising panning and zooming the image by mapping image coordinates directly from the block length map at the portable computing device.

13. The method as recited in claim 12, further comprising panning the image by reindexing image data from the block length map, wherein the image data is stored in a circular array cache.

14. The method as recited in claim 1, further comprising storing the block length map in an application data marker of the image file at the portable computing device.

15. A system, comprising:
 a processor;
 means executable by the processor for generating a block length map indicating image block starting positions of a bitstream representing an image by parsing the bitstream, wherein a block length is determined for each block of the image, and wherein the block length map is generated during idle time in the system;
 means executable by the processor for determining a granularity by which to parse the bitstream, wherein the granularity is based on processing power of the system;
 means executable by the processor for parsing the bitstream representing the image according to a coarser granularity when a data size of the block length map is too large in relation to processing power of the system, wherein the bitstream is parsed with the coarser granularity by determining the block length for blocks of the image every several blocks rather than determining the block length for each block of the image;
 means executable by the processor for determining an optimal value by obtaining a value of a minimum argument when a summation of a rounded up value of the length of each of the plurality of blocks over the value of the minimum argument multiplied by a frequency corresponding to the length and the value of the minimum argument is less than a summation of a rounded up value of the length of each of the plurality of blocks over the value of one increment of the minimum argument multiplied by the frequency corresponding to the length and the value of the one increment of the minimum argument;
 means executable by the processor for placing the block length map into the bitstream, wherein the block length map is indicated in the bitstream by a particular marker; and
 means executable by the processor for rendering the image using the block length map.

16. The method of claim 1, wherein the fixed number of bits is insufficient to represent the full length of a particular block.

17. The method of claim 16, further comprising representing the length of the particular block by an exit code followed by a residue, wherein the exit code includes continuous zero bits having a length of the fixed number of bits or continuous one bits having a length of the fixed number of bits.

18. The system of claim 15, further comprising means for inserting a byte into a second bitstream to indicate the granularity related to the block length determination, wherein the second bit stream represents the block length map.

19. The method of claim 1, wherein the fixed number of bits is determined based on a number of occurrences of blocks of specified lengths in the first bitstream.

20. A method comprising:
   obtaining an image file at a portable computing device that is configured to accelerate image rendering, and the image file including a first bitstream that is associated with a captured image, wherein at least a portion of the first bitstream represents a plurality of blocks related to the captured image, and wherein the first bitstream is encoded according to a joint photographic experts group (JPEG) format;
   determining an optimal value by obtaining a value of a minimum argument when a summation of a rounded up value of the length of each of the plurality of blocks over the value of the minimum argument multiplied by a frequency corresponding to the length and the value of the minimum argument is less than a summation of a rounded up value of the length of each of the plurality of blocks over the value of one increment of the minimum argument multiplied by the frequency corresponding to the length and the value of the one increment of the minimum argument;
   generating intermediate data at the portable computing device, the intermediate data derived from the encoded first bitstream, wherein the intermediate data comprises a block length map representing a length of each of the plurality of blocks related to the captured image and a DC values map that includes DC values of the plurality of blocks of the captured image ordered according to an ordering of the DC values in the first bitstream;
   storing, by the portable computing device, the intermediate data in a file separate from the image file in a directory that includes additional files storing respective intermediate data of a plurality of additional images, wherein the first bitstream includes a pointer to the file storing the intermediate data of the captured image; and
   rendering the captured image, by the portable computing device, by retrieving the intermediate data of the captured image from the file and by utilizing the intermediate data to locate desired bits of the first bitstream.

* * * * *